Feb. 18, 1969   H. E. FRANKENBERG   3,428,010
METHOD OF MAKING A METALLIC CAN AND COVER
Filed Feb. 3, 1967   Sheet 1 of 3
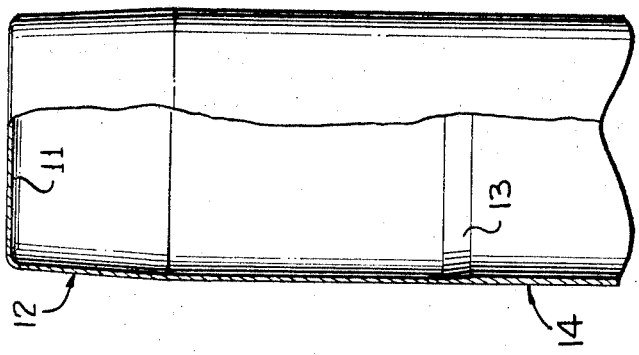
FIG. 5
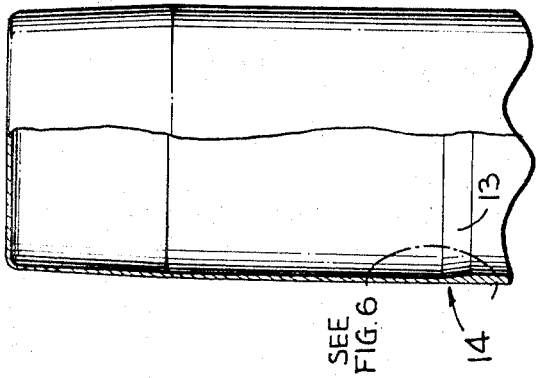
FIG. 4
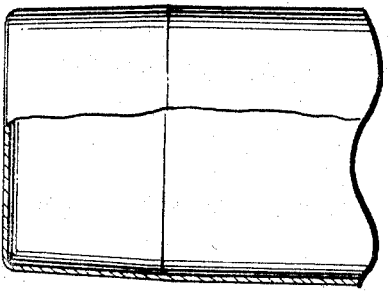
FIG. 3
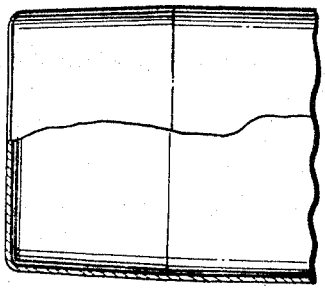
FIG. 2
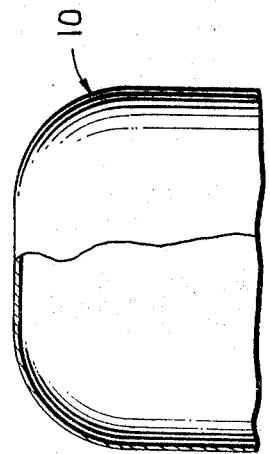
FIG. 6
FIG. 1
INVENTOR
HENRY E. FRANKENBERG
BY
Mason, Porter, Diller & Brown
ATTORNEYS

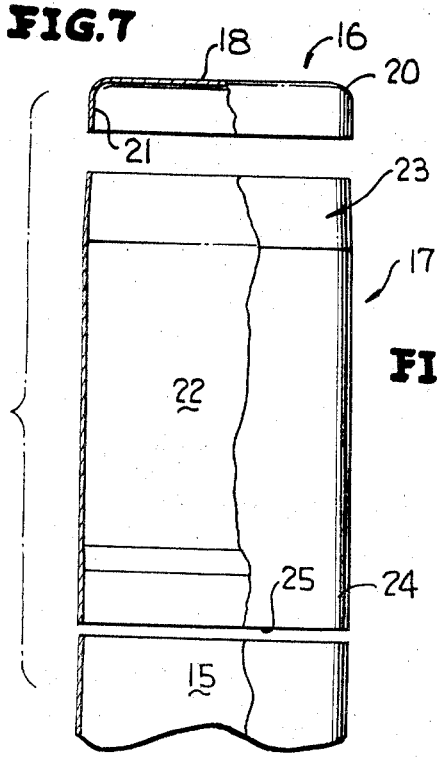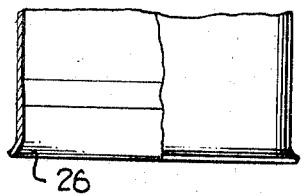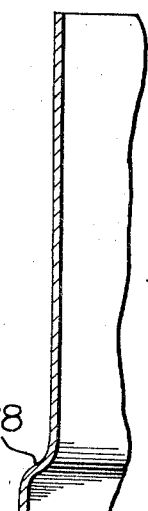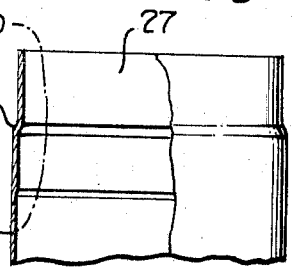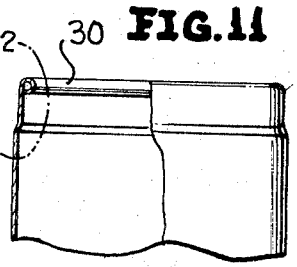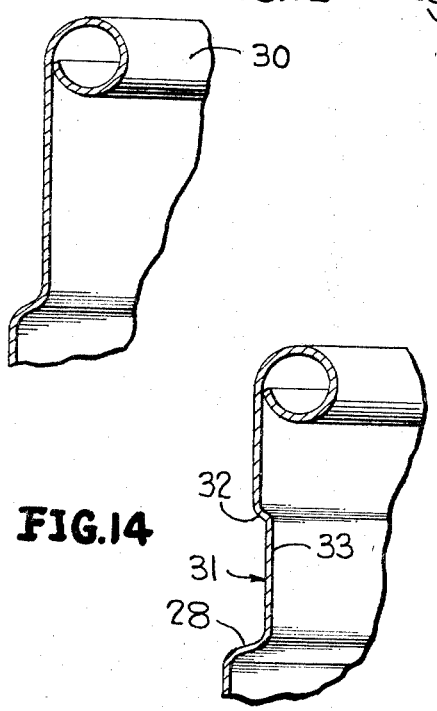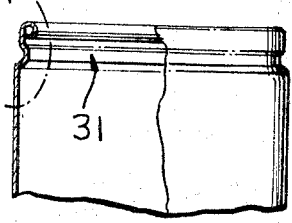

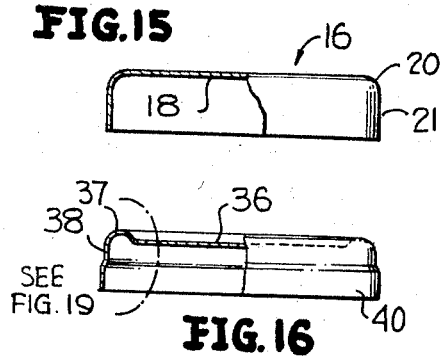
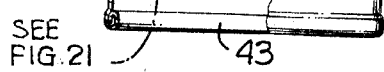
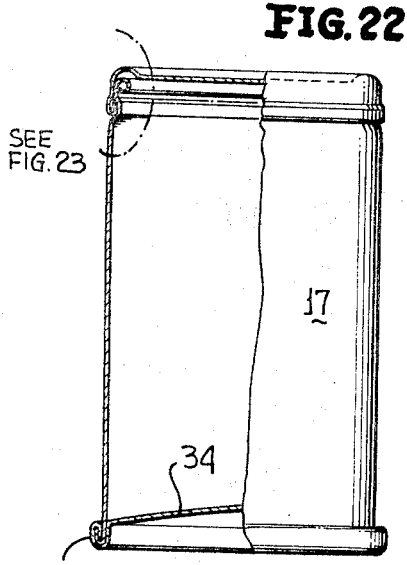
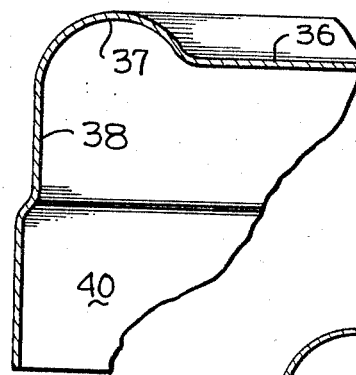
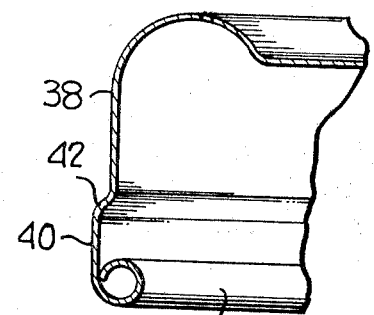
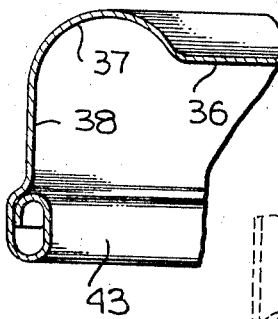
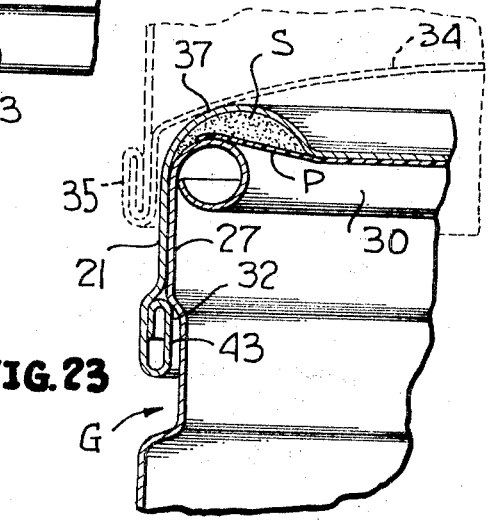
INVENTOR
HENRY E. FRANKENBERG

United States Patent Office 3,428,010
Patented Feb. 18, 1969

3,428,010
METHOD OF MAKING A METALLIC CAN AND COVER
Henry E. Frankenberg, Berwyn, Ill., assignor to Continental Can Company, Inc., New York, N.Y., a corporation of New York
Filed Feb. 3, 1967, Ser. No. 613,933
U.S. Cl. 113—120
Int. Cl. B21d 51/26, 51/44
16 Claims

ABSTRACT OF THE DISCLOSURE

This invention relates to a method of making a metallic can and cover from a single metallic blank by drawing, redrawing and wall-ironing the blank to form a hollow member which is trimmed and severed to form a cap-like member and a tubular body. The tubular body is flanged at one end and an opposite end is sequentially necked-in, curled and beaded. The cap-like member is re-formed, panelled, and a peripheral skirt thereof is provided with a curl which snappingly engages with the bead of the tubular body when these components are assembled. An end closure may also be seamed to the flanged end of the body.

---

A primary object of this invention is to provide a novel method of manufacturing a tubular body, such as a can body, and an associated closure or cover from a single piece of material by first drawing, redrawing and wall-ironing a blank to form an elongated hollow member having axially opposite end portions one of which is opened and the other of which is closed by an integral end wall, trimming the open end portion to form a regular edge, severing the hollow member adjacent the closed end to form a cap-like member defined by a peripheral skirt and an end panel and a tubular body having axially opposite open end portions, forming a peripheral reinforcement of a predetermined internal diameter from the material of the peripheral skirt, and forming a peripheral reinforcement from the material of a first end portion of the tubular body of an external diameter corresponding generally to the diameter of the first-mentioned reinforcement whereby the cap-like member or cover is adapted for assembly upon the reinforced end portion of the tubular body with the peripheral skirt in external telescopic relationship therewith.

Still another object of this invention is to provide a novel method of forming a tubular body and a closure in the manner heretofore set forth, and including the additional steps of necking-in the first end portion of the tubular body and forming a peripheral bead thereat respectively prior to and after forming the peripheral reinforcement at the first end portion whereby the peripheral bead is adapted to receive and snappingly engage with the reinforced portion of the closure or cap-like member.

A further object of this invention is to provide a novel method of forming a tubular body and a closure member by performing the steps heretofore described, and additionally flanging an opposite end of the tubular body, and seaming an end closure to the flanged end of the tubular body to form a container or can into which a product can be packaged and readily removed by simply removing the closure member therefrom.

A further object of this invention is to provide a novel method of forming a tubular body and a closure member in the manner heretofore described wherein the peripheral reinforcement of the closure is formed by curling the material thereof, and the curl is thereafter flattened to impart a generally polygonal cross-sectional configuration thereto for snap engagement with the peripheral bead of the tubular body.

With the above and other objects in view that will hereinafter appear, the nature of the invention will be more clearly understood by reference to the following detailed description, the appended claimed subject matter, and the several views illustrated in the accompanying drawings.

In the drawings:

FIGURE 1 is a fragmentary side elevational view with a portion thereof broken away for clarity, and illustrates a hollow member formed by initially drawing a sheet material blank between male and female drawing dies.

FIGURES 2 through 5 are fragmentary side elevational views partly in section, and sequentially illustrate the configuration of the hollow member during the redrawing and wall-ironing thereof between a male die or plunger and female redrawing and wall-ironing dies.

FIGURE 6 is an enlarged fragmentary cross-sectional view of a portion of the hollow member of FIGURE 4, and more clearly illustrates the cross-sectional configuration thereof.

FIGURE 7 is an exploded side elevational view of the hollow member after having been trimmed, and illustrates a cap-like member and a tubular body formed from the hollow member.

FIGURE 8 is a fragmentary side elevational view partially in section of a lower portion of the tubular body, and illustrates a radially outwardly directed flange thereof.

FIGURE 9 is a fragmentary side elevational view partly in section of an upper portion of the tubular body, and illustrates the configuration thereof after being necked-in.

FIGURE 10 is a fragmentary enlarged sectional view of a portion of the tubular body of FIGURE 9, and more clearly illustrates the configuration of the body wall.

FIGURE 11 is a side elevational view of the tubular body partially in cross-section, and illustrates a curl formed by curling the necked-in portion of the body.

FIGURE 12 is an enlarged fragmentary sectional view of the curled portion of the body of FIGURE 11, and more clearly illustrates the cross-sectional configuration thereof.

FIGURE 13 is a fragmentary elevational view partially in section of the tubular body, and illustrates an outwardly opening peripheral bead disposed adjacent and beneath the curl.

FIGURE 14 is an enlarged fragmentary sectional view of a portion of the tubular body of FIGURE 13, and more clearly illustrates the cross-sectional configuration of the wall thereof.

FIGURES 15 through 18 are side elevational views with portions broken away for clarity of the cap or closure member of FIGURE 7, and diagrammatically illustrate the steps of reforming and panelling, curling and flattening the curl to form a cover.

FIGURES 19 through 21 are highly enlarged sectional views of portions of the cap member of FIGURES 16 through 18, respectively, and illustrate the cross-sectional configurations of the walls after each forming operation.

FIGURE 22 is a side elevational view partially in section of the completed container, and illustrates an end closure seamed to a bottom thereof and the closure of FIGURE 18 in snap-engagement with the upper portion of the body.

FIGURE 23 is a highly enlarged fragmentary view of a portion of the closure and body of FIGURE 22, illustrating these elements in assembled relationship, and another container in phantom outline seated in interlocked stacked relationship upon the closure.

Referring first to FIGURE 1 of the drawings, a planar circular blank of metallic material (not shown), such as tin plate, is first drawn between a conventional male die or plunger (not shown) and a female die (also not shown) to form a hollow cup-shaped member 10. The member 10 may be, for example, approximately 2⅜ inches in height and have a wall thickness and external diameter of .0145 in. and 3.403 in., respectively.

The cup-shaped member 10 of FIGURE 1 is thereafter redrawn (FIGURE 2) and wall-ironed (FIGURES 3 through 5) between a single male die or plunger (not shown) and three female dies (also not shown), the first of which is a redrawing die and the remaining three of which are ironing dies having progressively reduced diameters. These male and female dies may be, for example, of the type disclosed in applicant's commonly assigned application Serial No. 469,622, filed July 6, 1965, and now Patent No. 3,406,554. During the redrawing and ironing stages of the second operation the member 10 is progressively elongated and the wall thickness is reduced between an end panel 11 and an end portion 12 and a progressively thicker portion 13 at an end portion 14. The wall thickness of the lower end portion 14 of the member 10 is greater than the remaining wall thickness to facilitate the formation of a flange thereat, as will be described more fully hereafter, to which is seamed an end closure.

At the completion of the third wall-ironing stage (FIGURE 5) the external diameter of the member 10 is approximately 2.5815 inches and its axial length is approximately 7 inches. The wall thickness of the member 10 at the portion 13 is approximately .0045 inch while the thickness below this same wall portion is approximately .0056 inch.

After the hollow member 10 has been wall-ironed to the configuration and size illustrated in FIGURE 5 and has been removed from the dies, the same is subjected to simultaneous trimming and severing operations (FIGURE 7) during which time a generally annular band of scrap material 15 is removed from the member 10 and the latter is separated into a cap-like member or closure member 16 and a tubular body 17. The cap-like member 16 includes an end panel 18 joined by a radius portion 20 to a peripheral skirt 21. The tubular body 17 is defined by a central body portion 22 and axially opposite end portions 23, 24, the latter of which now includes a regular edge 25 as a result of the trimming operation. At this point the axial height of the cap-like member 16 is approximately .50 inch while the axial height of the tubular body 17 is approximately 4.270 inches.

The trimming operation may be performed in the manner disclosed in the latter-noted application or the untrimmed member 10 may be removed from the male plunger and both the trimming and the severing operations may be performed simultaneously. In either case the one-piece member 10 is transformed into the cap-like member 16 and a tubular body 17.

The lower end portion 24 of the tubular body 17 is thereafter flanged (FIGURE 8), and the upper end portion 23 is sequentially necked-in (FIGURE 9), curled (FIGURE 11) and beaded (FIGURE 13) by conventional flanging, necking-in, curling and beading mechanisms, respectively.

The flanging operation forms a radially outwardly directed peripheral flange 26 at the lower end portion 24 of the body 17 causing a slight reduction in the overall axial height from 4.270 inches to approximately 4.208 inches. A necked-in portion 27 (FIGURE 9) of the body portion 23 similarly results in a reduction in the diameter of the end portion 23 from approximately 2.50 inches (FIGURE 7) to approximately 2.489 inches (FIGURE 11). The necking-in operation also forms a tapering shoulder 28 which joins the central body portion 22 to the necked-in portion 27, in the manner best illustrated in FIGURE 10 of the drawings.

During the curling operation the necked-in portion 27 is directed radially inwardly downwardly and outwardly to form a curl 30 (FIGURES 11 and 12).

During the beading operation an outwardly opening peripheral bead 31 is formed adjacent and below the curl 30. The bead 31 is of a relatively shallow U-shaped cross-sectional configuration, and is defined by the shoulder 28, a shoulder 32 and an annular wall portion 33 (FIGURE 14). The tubular body 17 (FIGURE 22) may be provided with an end closure 34 secured thereto by a conventional double seam 35. If desired, the closure 34 can be seamed to the lower end portion of the body 17 any time after the flange 26 is formed and may be done prior to or after the necking-in curling and beading operations performed on the body 17.

The cap-like member or closure 16 (FIGURE 15) is reformed (FIGURES 16 and 19) between male and female dies (not shown) to form a recessed end panel 36 joined by a downwardly opening annular curl 37 to a peripheral skirt portion 38 offset radially from a terminal skirt portion 40.

The terminal skirt portion 40 is then curled radially inwardly upwardly and outwardly to form a curl 41 (FIGURES 17 and 20) which is of a generally circular cross-sectional configuration and is axially spaced from a shoulder 42 bridging the skirt portions 38 and 40 (FIGURE 20). The inner diameter of the curl 41 is approximately 2.394 inches and the axial height of the closure member is approximately .369 inch.

Thereafter the closure member 16 is placed in a female die (not shown) and a male die is operative to flatten the curl 41 and form a flattened curl 43 (FIGURES 18 and 21). This transforms the generally circular cross-sectional configuration of the curl 41 to a polygonal configuration, and increases the internal diameter thereof to approximately 2.467 inches. The axial height of the closure member 16 is also increased to .375 inch while the distance from the top of the curl 43 to the top of the curl 37 is approximately .268 inch.

The dimensioning of the closure or cover 16 (FIGURE 23) and the body 17 is such that the curl 43 is partially received within the bead 31 and snappingly interlockingly engages the shoulder 32 to maintain these components in assembled relationship. To remove the closure 16 the latter is manually grasped and drawn upwardly as viewed in FIGURE 23 of the drawings with sufficient force to overcome the engagement between the curl 43 and the shoulder 32. Re-application of the closure to the body 17 is similarly effected by merely urging the peripheral skirt 21 downwardly in external telescopic relationship to the necked-in portion 27 until the curl 43 again snappingly interlockingly engages beneath the shoulder 32. An annular gap G (FIGURE 23) is also provided between the shoulder 28 and the lowermost portion of the curl 43 to insert an instrument between the curl 43 and the annular wall portion 32 to pry off the closure.

The closure 16 may be optionally provided with conventional sealing compound S in the curl 37 (FIGURE 23), and a circular seal P of paper or impermeable material may be adhered to the body curl 30. The lower closure 34 is also preferably recessed in the manner illustrated in FIGURES 22 and 23 of the drawings to facilitate the stacking of identical containers constructed in accordance with the method of this invention.

From the foregoing, it will be seen that novel and advantageous provisions have been made for carrying out the desired end. However, attention is directed to the fact that additional variations may be made in this invention without departing from the spirit and scope thereof as defined in the appended claims.

I claim:

1. A method of forming a tubular body and a cap-like member comprising the steps of providing a generally elongated hollow member having axially opposite end portions one of which is open and the other of which is closed by an integral end wall, severing the hollow member between the end portions thereof to form a cap-like member defined by a peripheral skirt and an end panel and a tubular body having axially opposite open end portions, forming a peripheral reinforcement of a predetermined internal diameter from the material of the peripheral skirt, and forming a peripheral reinforcement from the material of a first end portion of the tubular body of an external diameter corresponding generally to the diameter of the first-mentioned reinforcement whereby the cap-like member is adapted for assembly upon the reinforced end portions of the tubular body with the peripheral skirt in external telescopic relationship therewith.

2. The method as defined in claim 1 including the step of necking-in the first end portion of the tubular body prior to forming the peripheral reinforcement at the first end portion.

3. The method as defined in claim 1 including the further steps of necking-in the first end portion of the tubular body and forming a peripheral bead thereat respectively prior to and after forming the peripheral reinforcement at the first end portion.

4. The method as defined in claim 1 including the step of reforming the cap-like member to form radially offset peripheral skirt portions prior to peripherally reinforcing the skirt.

5. The method as defined in claim 1 including the step of curling the material of the peripheral skirt to form the peripheral reinforcement thereat, and flattening the last-mentioned reinforcement to impart a generally polygonal cross-sectional configuration thereto.

6. The method as defined in claim 1 including the steps of flanging the second end portion of the tubular body to form a radially outwardly directed peripheral flange thereat.

7. A method of forming a tubular body and a cap-like member comprising the steps of drawing a blank of sheet material to form a generally elongated hollow member having axially opposite end portions one of which is open and the other of which is closed by an integral end wall, trimming the open end portion to form a regular edge, severing the hollow member adjacent the closed end to form a cap-like member defined by a peripheral skirt and an end panel and a tubular body having axially opposite open end portions, forming a peripheral reinforcement from the material of the peripheral skirt, and forming a peripheral reinforcement from the material of a first end portion of the tubular body.

8. The method as defined in claim 7 wherein the trimming and severing operations are performed simultaneously.

9. The method as defined in claim 7 including the step of flanging the other end portion of the tubular body to form a radially outwardly directed flange.

10. The method as defined in claim 7 including the step of necking-in the first end portion of the tubular body prior to forming the peripheral reinforcement at the first end portion.

11. The method as defined in claim 7 including the step of forming a peripheral bead at the first end portion of the tubular body after forming the peripheral reinforcement at the first end portion.

12. The method as defined in claim 7 including the further steps of necking-in the first end portion of the tubular body and forming a peripheral bead thereat respectively prior to and after forming the peripheral reinforcement at the first end portion.

13. The method as defined in claim 12 including the step of reforming the cap-like member to form radially offset peripheral skirt portions prior to peripherally reinforcing the skirt.

14. The method as defined in claim 13 including the step of curling the material of the peripheral skirt and the first end portion of the body to form the peripheral reinforcements thereat.

15. The method as defined in claim 14 including the step of flattening the reinforcement of the cap-like member to impart a generally polygonal cross-sectional configuration thereto.

16. The method as defined in claim 15 including the steps of flanging the other end portion of the tubular body, and seaming a closure to the flanged end portion.

References Cited

UNITED STATES PATENTS

| 2,142,743 | 1/1939 | Calleson | 113—120 |
| 2,292,669 | 8/1942 | Sinclair et al. | 113—120 |

CHARLES W. LANHAM, *Primary Examiner.*

RONALD D. GREFE, *Assistant Examiner.*

U.S. Cl. X.R.

113—121